(12) United States Patent
Huke et al.

(10) Patent No.: US 11,094,171 B2
(45) Date of Patent: Aug. 17, 2021

(54) AI WAGER ODDS ADJUSTER

(71) Applicant: AdrenalineIP, Washington, DC (US)

(72) Inventors: Casey Alexander Huke, Washington, DC (US); John Cronin, Jericho, VT (US); Joseph Bodkin, Quincy, MA (US); Harrison Grant, Anaheim, CA (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/081,185

(22) Filed: Oct. 27, 2020

(65) Prior Publication Data

US 2021/0217278 A1 Jul. 15, 2021

Related U.S. Application Data

(60) Provisional application No. 62/958,808, filed on Jan. 9, 2020.

(51) Int. Cl.
| | |
|---|---|
| *G07F 17/32* | (2006.01) |
| *G06F 16/23* | (2019.01) |
| *G06Q 50/34* | (2012.01) |
| *G06Q 40/02* | (2012.01) |
| *G06N 20/00* | (2019.01) |

(52) U.S. Cl.
CPC ...... *G07F 17/3288* (2013.01); *G06F 16/2379* (2019.01); *G06N 20/00* (2019.01); *G06Q 40/02* (2013.01); *G06Q 50/34* (2013.01); *G07F 17/323* (2013.01)

(58) Field of Classification Search
USPC .......................................................... 463/25
See application file for complete search history.

(56) References Cited

U.S. PATENT DOCUMENTS

| | | | | |
|---|---|---|---|---|
| 10,535,230 | B2 * | 1/2020 | Lutnick | ............ G07F 17/3279 |
| 2006/0094506 | A1 | 5/2006 | Tarter et al. | |
| 2014/0370958 | A1 * | 12/2014 | Lutnick | ................. G07F 17/32 |
| | | | | 463/17 |
| 2018/0204417 | A1 | 7/2018 | Triplett | |
| 2019/0122482 | A1 | 4/2019 | Amaitis et al. | |
| 2019/0180558 | A1 | 6/2019 | Merati | |
| 2020/0160666 | A1 * | 5/2020 | Lutnick | ............ G07F 17/3293 |
| 2020/0357236 | A1 * | 11/2020 | Danielson | ............. G06Q 50/34 |

OTHER PUBLICATIONS

Notification of Transmittal of the International Search Report and the Written Opinion of the International Searching Authority dated Mar. 24, 2021, in connection with corresponding international Application No. PCT/US2021/012162 (9 pp.).

* cited by examiner

*Primary Examiner* — Pierre E Elisca
(74) *Attorney, Agent, or Firm* — Maier & Maier, PLLC

(57) ABSTRACT

A method and system for using artificial intelligence (AI) to assess and adjust the betting odds for live game wagers before they are presented to users based correlations between various parameters and user betting behavior, and to adjust the betting odds while the betting window is open based on how users are currently betting compared to expected user betting behavior.

14 Claims, 5 Drawing Sheets

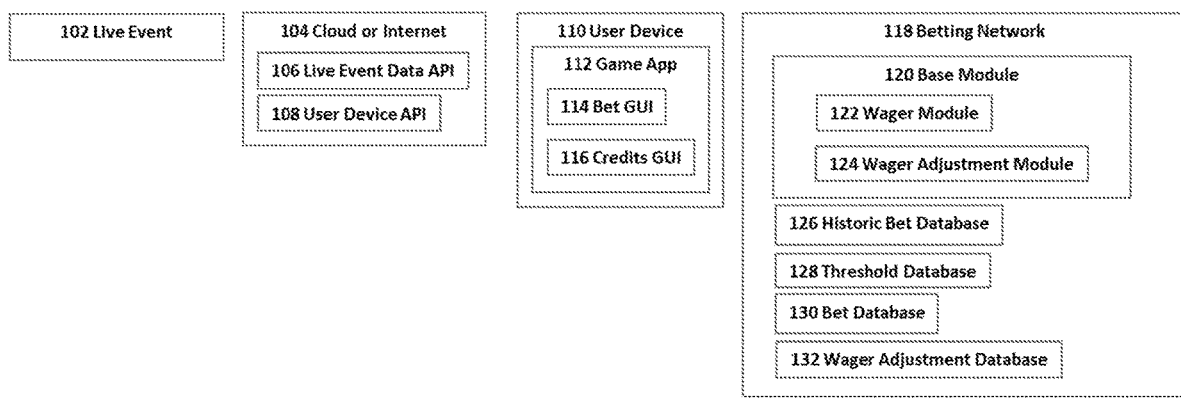
Fig.1 Content - High Level Diagram
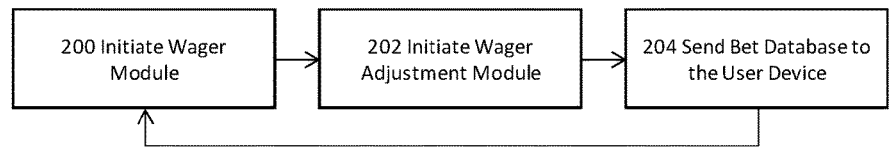
Fig.2 Base Module

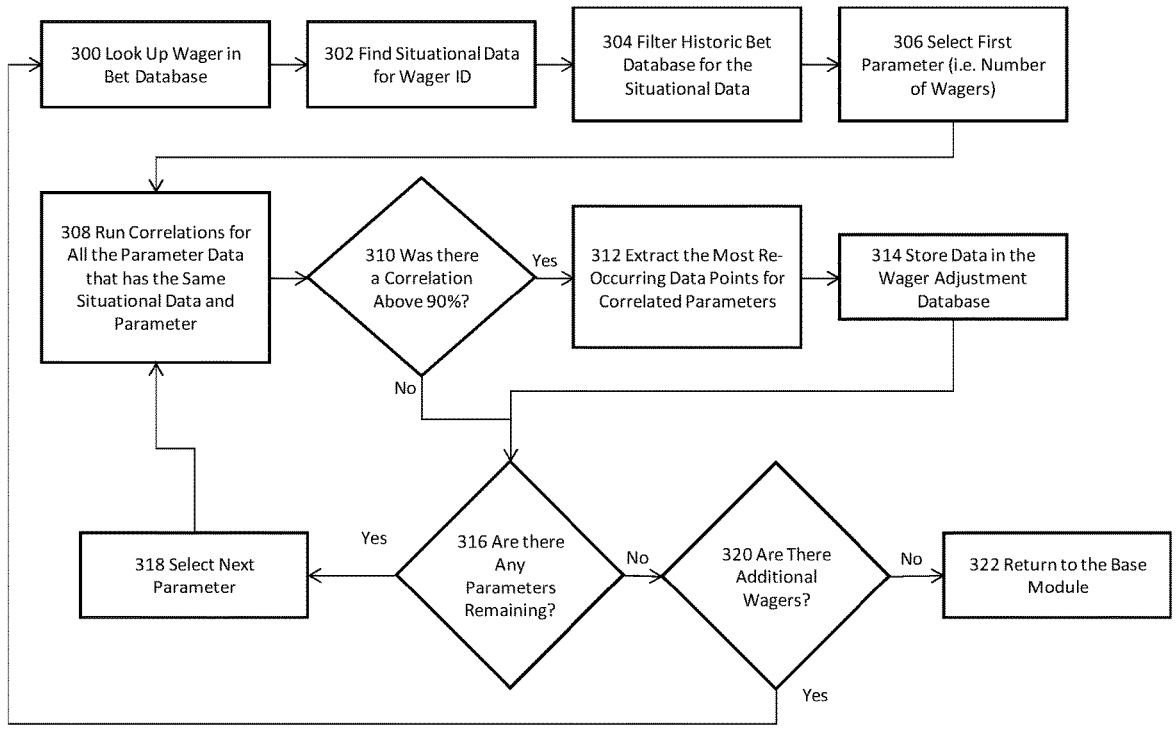
Fig.3 Wager Module
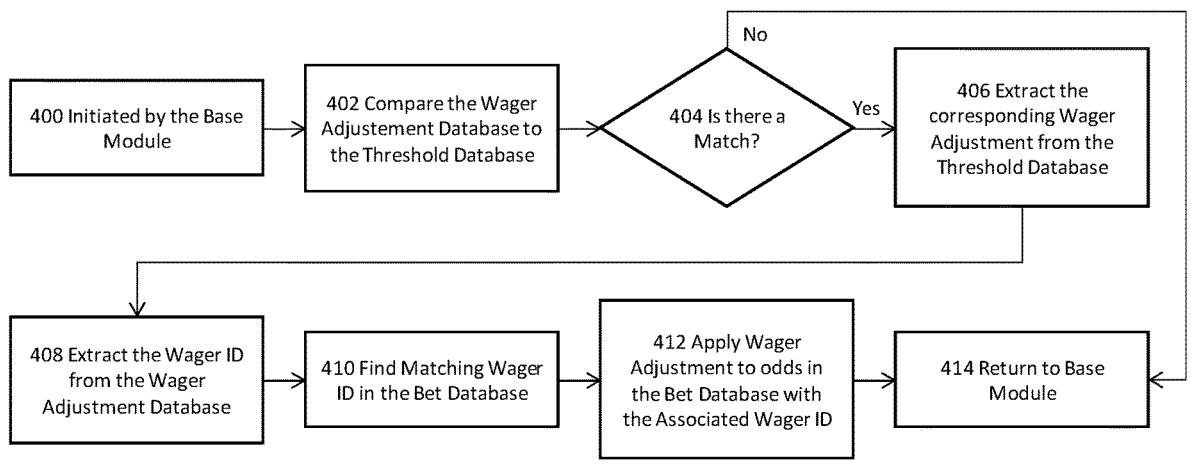
Fig.4 Wager Adjustment Module

| Wager ID | Situational Data | | | | Parameters | | | |
|---|---|---|---|---|---|---|---|---|
| | | | To Gain | | | Total Amount Paid Out | | |
| 100065 | Patriots | 2nd | 1st | 10 | Pass | 259 | $10,564 | $0 | $10,564 | Boston, MA |
| 100090 | Patriots | 2nd | 1st | 10 | Pass | 138 | $5,890 | $5,890 | ($5,890) | Boston, MA |
| 100187 | Patriots | 2nd | 1st | 10 | Pass | 176 | $7,895 | $7,895 | ($7,895) | Boston, MA |
| 100265 | Patriots | 2nd | 1st | 10 | Pass | 154 | $6,875 | $0 | $6,875 | Boston, MA |
| 100359 | Patriots | 2nd | 1st | 10 | Pass | 215 | $8,900 | $0 | ($8,900) | Boston, MA |
| - | - | - | - | - | - | - | - | - | - | - |
| - | - | - | - | - | - | - | - | - | - | - |

Fig.5 Historic Bet Database

| Number of Wagers | Amount Wagered | Wager Adjustment |
|---|---|---|
| 200 | $7,500 | 5% decrease |
| 275 | $12,500 | 10% decrease |
| 350 | $15,000 | 15% decrease |
| 400 | $20,000 | 20% decrease |
| - | - | - |
| - | - | - |
| - | - | - |

Fig.6 Threshold Database

| Wager ID | Team | Quarter | Down | To Gain | Wager | Odds | Current Number of Wagers | Current Amount Wagered |
|---|---|---|---|---|---|---|---|---|
| 123654 | Patriots | 2nd | 1st | 10 | Pass | -105 | 201 | $5,500 |
| 123655 | Patriots | 2nd | 1st | 10 | Run | -115 | 158 | $7,550 |
| 123656 | Patriots | 2nd | 1st | 10 | Over 5 yards gained | -110 | 50 | $1,500 |
| 123657 | Patriots | 2nd | 1st | 10 | Under 5 yards gained | -105 | 25 | $875 |
| - | - | - | - | - | - | - | - | - |
| - | - | - | - | - | - | - | - | - |
| - | - | - | - | - | - | - | - | - |

Fig.7 Bet Database

| Wager ID | Wager | First Extracted Parameter | Second Extracted Parameter |
|---|---|---|---|
| 123654 | Pass | Number of Wagers 200 | Total Amount of Wagers $7,500 |
| 123655 | Run | Number of Wagers 200 | Total Amount of Wagers $7,500 |
| - | - | - | - |
| - | - | - | - |

Fig.8 Wager Adjustment Database

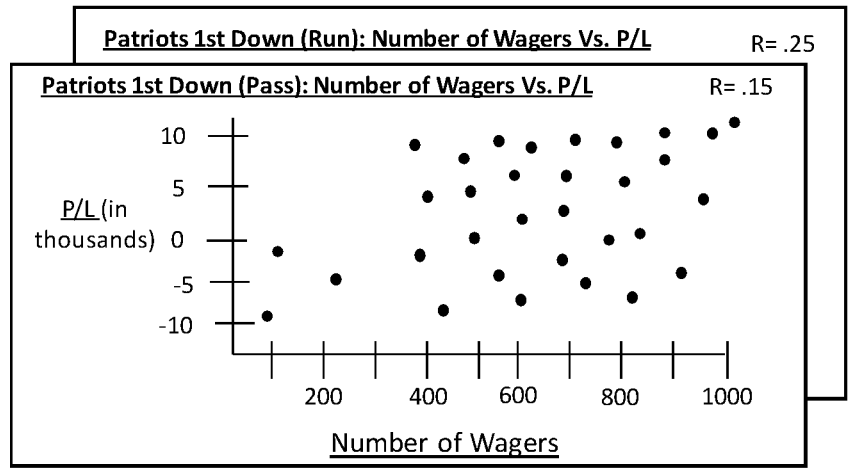
Fig.9A Example of Wager Module
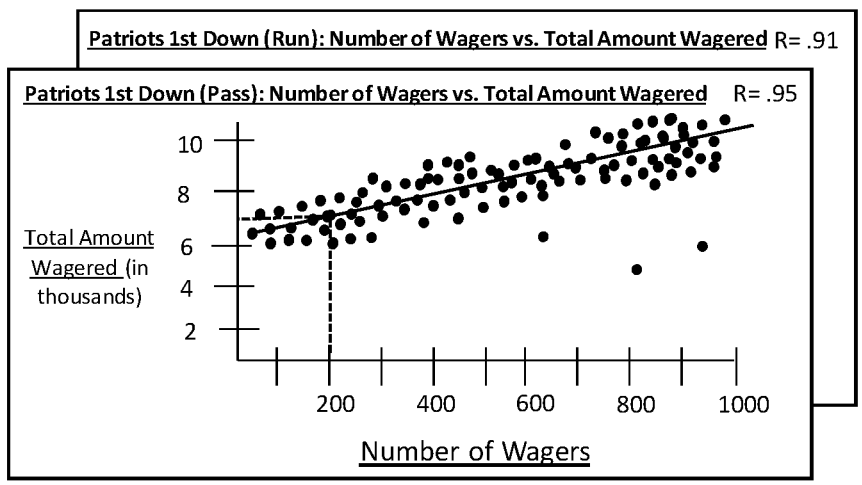
Fig.9B Example of Wager Module ature in the prior art.
AI WAGER ODDS ADJUSTER

CROSS-REFERENCE TO RELATED APPLICATIONS

The present patent application claims benefit and priority to U.S. Provisional Patent Application No. 62/958,808 entitled "AI WAGER ODDS ADJUSTER" filed on Jan. 9, 2020 which is hereby incorporated by reference into the present disclosure.

FIELD OF THE DISCLOSURE

The embodiments are generally related to sports wagering and artificial intelligence.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

When odds are calculated for a wager objective data and statistics are used so that the payout is proportional to the actual chances of the outcome. A problem is that people do not usually place wagers based on objective data, which can result in largely one sided bets that could result in a loss for the house. Another problem is that when demand one side of a wager greatly exceeds the demand expected based on the odds, the house misses out on profit it could have made by offering lower odds. Yet another problem is that errors in the original odds calculation could be exploited by clever users if the odds aren't subsequently adjusted. d

SUMMARY

Embodiments include methods, systems, and apparatuses for using artificial intelligence to adjust wagering odds for a live event in real time. On embodiment includes a method of adjusting wager odds, including filtering a historic database to match a current wager, selecting a common parameter within historic data in the historic database, performing correlations for the selected parameter against other parameters within the historic database, determining if there is correlated data and the correlated data exceeds a first threshold, extracting data points from the correlated data that exceeds the first threshold, comparing the extracted data points to one or more predetermined second thresholds, and adjusting a current wager if the extracted data exceeds at least one of the one or more second thresholds.

Another embodiment includes a computer implemented method for providing odds in a game program using game information, including executing on a processor the steps of: displaying data related to a live sporting event in real time; displaying one or more wagers related to real time wagering in the live sporting event; displaying at least one or more factors related to odds adjustment for the one or more wagers; and displaying one or more adjusted odds for the one or more wagers based on the one or more factors.

BRIEF DESCRIPTIONS OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 illustrates an artificial intelligence based live game wager adjuster, according to an embodiment.

FIG. 2 illustrates a base module, according to an embodiment.

FIG. 3 illustrates a wager module, according to an embodiment.

FIG. 4 illustrates a wager adjustment module, according to an embodiment.

FIG. 5 illustrates a historic bet database, according to an embodiment.

FIG. 6 illustrates a threshold database, according to an embodiment.

FIG. 7 illustrates a bet database, according to an embodiment.

FIG. 8 illustrates a wager adjustment database, according to an embodiment.

FIG. 9A illustrates an example of a wager module, according to an embodiment.

FIG. 9B illustrates an example of a wager module, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are services that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

This is a system for an artificial intelligence based live game wager system. This system includes a live event 102, for example a sporting event such as a football game, basketball game, baseball game, hockey game, tennis match, golf tournament, etc. A cloud 104 or communication network which may be a wired and/or a wireless network may also be included. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over Internet and relies on sharing of resources to achieve coherence and economies of scale, like a public utility, while third-party clouds enable organizations to focus on their core businesses instead of expending resources on computer infrastructure and maintenance. A live event data API 106, or application program interface, for delivering data from the live event to the betting network 122, may also be included. A user device API 108, or application program interface, for delivering data between the betting network and the user device, may also be included. A user device 110 for connecting to the cloud or Internet and running the game app 112, may also be included. A game app 112 that displays the odds for the next action of the live game, allows the user to place a bet, and displays the user's credits, may also be included. A bet GUI 114, or guided user interface, that displays the possible betting options and odds for each betting option, the odds determine the ratio of credits bet to credits returned if the bet was correct. The interface(s) may either accept inputs from users or provide outputs to the users or may perform both the actions. In one case, a user can interact with the interface(s) using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. Further, the interface (s) may either be implemented as a Command Line Interface (CLI), a Graphical User Interface (GUI), a voice interface, or a web-based user-interface, may also be included. A credits GUI 116, or guided user interface, that display's the user's current amount of credits in the credit database, winning bets may increase the user's amount of credits while losing bets may decrease the user's amount of credits, credits may be tied to a real money value, may also be included. A betting network 118 which provides an Artificial intelligence based software module that finds correlations from the historic bet database 126 in order to determine if the odds for the current wagers in the bet database need to be adjusted, may also be included. A base module 120 which initiates the wager module and then initiates the wager adjustment module and sends an updated bet database to the user device, may also be included. A wager module 122 which uses the situational data from the historic bet database 126 on previous wagers with the same situational data and performs correlations on the similar wagers in order to determine if there is a correlation from the historic data in order to extract and store the most re-occurring data point in order to update the odds in the bet database, may also be included. A wager adjustment module 124 which uses the most re-occurring data points that were extracted via the wager module and stored in the wager adjustment database and compares them to the threshold database in order to determine if the odds in the bet database should be updated based on the wager adjustments in the threshold database, may also be included. A historic bet database 130 which stores all the historic bets previously placed by users, may also be included. A threshold database which is used to determine the appropriate adjustment in the wager odds by using the extracted most re-occurring data points and if one of the two data points exceeds the threshold database then the wager adjustment in the threshold database is used to update the odds in the bet database, may also be included. A bet database which contains the current bets that users can place a wager on, may also be included. A wager adjustment database which stores the most re-occurring data points extracted from the wager module along with the wager ID and wager in order to be compared with the threshold database in the wager adjustment module to determine if the odds in the bet database should be adjusted, may also be included.

Functioning of the base module will now be explained with reference to FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the base module. The process begins with the base module initiating the wager module, at step 200. Then the base module e initiates the wager adjustment module, at step 202. Once the bet database has been updated, or not, via the wager module and wager adjustment module the base module sends the bet database to the user device, at step 204.

Functioning of the wager module will now be explained with reference to FIG. 3. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the wager module. The process begins with the wager module looking up the current wager in the bet database, at step 300. Then the wager module finds the situational data for the wager ID, which may be the team, the quarter or time of the event, the down, the distance to gain, etc., at step 302. The historic bet database is filtered on the situational data for the wager ID in order to find all the other previous wagers that have the same situational data, at step 304. The first parameter in the historic bet database, for example the number of wagers placed, at step 306. The wager module then performs correlations for all the other parameter data that has the same situational data and first parameter, at step 308. It is then determined if there was a correlation above a predetermined threshold, for example, 90%, at step 310. If there was a correlation above the predetermined threshold then the most re-occurring data point. For example, in FIG. 9B, the most re-occurring data point for the correlation of number of wagers against the total amount wagered would be 200 wagers and $7,500 wagered. These two data points along with the wager ID from the bet database would be stored in the wager adjustment database, at step 312. Then the extracted data points are stored in the adjustment database, at step 314. If it was determined there was no correlation above the predetermined threshold, then the wager module determines if there are any parameters remaining, at step 316. If there are parameters remaining, the next parameter is selected and the process returns to step 308, at step 318. If it is determined there are no parameters remaining, it is then determined if there are any additional wagers in the bet database. If there are additional wagers, the process returns to step 300, at step 320. If there are no additional wagers the process returns to the base module, at step 322.

Functioning of the wager adjustment module will now be explained with reference to FIG. 4. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the wager adjustment module. The process begins with the wager adjustment module being initiated by the base module, at step 400. The wager adjustment module compares the wager adjustment database to the threshold database, at step 402. It is determined if there is a match, for example the wager adjustment module has the most re-occurring data point which is 200 wagers and $7,500 wagered which when compared to the threshold results in the odds being decreased by 5%, at step 404. If there is a match then the corresponding wager adjustment from the threshold database, for example a 5% decrease, is extracted, at step 406. The wager ID from the wager adjustment module is also extracted in order to assist in adjusting the odds in the bet database, at step 408. The extracted wager ID is matched with the corresponding wager ID in the bet database, at step 410. The odds in the bet database are adjusted by the extracted wager adjustment, for example the 5% decrease from the threshold database. If the odds in the bet database are −105 and the wager adjustment is a 5% decrease then the odds in the bet database are adjusted and the new odds are −110, at step 412. If there is no match from the wager adjustment database to the threshold database then the process returns to the base module, at step 414.

Functioning of the historic bet database will now be explained with reference to FIG. 5. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the historic bet database which contains all the wager data from previously placed wagers by users. The database may contain situational data such as the wager ID, the team the wager was for, the quarter or time period of the game or event, the down, the distance to gain, and what the wager was for. The historic bet database also contains parameter data for each of the wagers such as the number of wagers which is the number of individual wagers placed by users on the wager, the total amount wagered on the bet, the total amount paid out to the users from the wager, the total amount retained by the network, the profit and/or loss from the wager from the standpoint of the betting network, and the location of the wager which is where the individual user was located when the placed the wager. The database as currently shown is filtered for the situational data and the parameter of the location in order to determine if there is any correlations between the parameter data while filtered on the location parameter to see if odds should be adjusted for users within the Boston area when placing a wager on the New England Patriots. In some embodiments, the situational data may be user specific bet history or bets previous made by a specific user or group of users. In some embodiments, the situational data may be bet data collected from various sportsbooks by region, nation, or a combination of specific regions or nations. In some embodiments, the situational data may be a collection of wager odds from third parties, for example casinos, sportsbooks, sports apps or websites, etc. In some embodiments, the situational data may be collected from an odds marketplace which is a collection of various wager odds from third parties. In some embodiments, the situational data may be filtered on user preferences, for example certain sportsbooks the user uses or specific regions of the country or specific nations that may provide different wager odds, element 500.

Functioning of the threshold database will now be explained with reference to FIG. 6. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the threshold database which contains the various predetermined thresholds to be compared with the extracted data points from the wager module in order to determine if the odds in the bet database should be adjusted to account for user trends within placing the wagers. The database may contain the number of wagers, the amount wagered and the associated wager adjustment which is used to adjust the odds in the bet database, element 600.

Functioning of the bet database will now be explained with reference to FIG. 7. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The bet database contains a list of all current wagers available to the users of the betting network. The database may contain the wager ID, the team, the quarter, the down, the distance to gain, the wager the odds, the current number of wagers and the current amount wagered, element 700.

Functioning of the wager adjustment database will now be explained with reference to FIG. 8. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the wager adjustment database which stores the most re-occurring data points extracted from the wager module along with the wager ID and wager in order to be compared with the threshold database in the wager adjustment module to determine if the odds in the bet database should be adjusted. The database may contain the wager ID, the wager, and the extracted first parameter or first extracted data point shown on the x-axis in FIG. 9B, and the second extracted parameter or second extracted data point shown on the y-axis in FIG. 9B, element 800.

An example of a wager module will now be explained with reference to FIG. 9. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays an example of the wager module and the resulting correlations. FIG. 9A: In this example the data that is filtered by the situational data and finding the various correlations with the number of wagers and the various parameters such as the profit and/or loss for a pass wager, for a run wager, etc. An example of non-correlated parameters with the situational data and the number of wagers and the profit and/or loss of the wager with a 15% (which is below the 90% threshold), therefore there is no correlation and no data should be extracted from the historic bet database and stored in the wager adjustment database. FIG. 9B displays an example of the correlations run in the wager module. In this example the data that is filtered by the situational data from the bet database and finding the various correlations with the number of wagers and the various patient parameters such as the total amount wagered for pass wager, the total amount wagered for run wager, etc. The highest correlated parameter with the number of wagers is the total amount wagered for a pass wager with a 95% (which is above the 90% threshold). Then the most re-occurring data point which is 200 wagers and $7,500 total amount wagered is extracted and stored in the wager adjustment database along with the wager ID from the bet database and this is compared to the threshold database which determines if any of these two data points are above a predetermined threshold to adjust the odds in the bet database, element 900. The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of adjusting wager odds, comprising
   filtering, with a processor, a historic database to match a current wager available on a gaming device,
   selecting, with a processor, a common parameter within historic data in the historic database,
   performing correlations, with a processor, for the selected parameter against other parameters within the historic database,
   determining, with a processor, if there is correlated data and the correlated data exceeds a first threshold,
   extracting, with a processor, data points from the correlated data that exceeds the first threshold,
   comparing, with a processor, the extracted data points to one or more second thresholds, and
   adjusting, with a processor, the current wager on the gaming device if the extracted data exceeds at least one of the one or more second thresholds.

2. The method of claim 1, further comprising adjusting the current wager available on the gaming device in real time between plays of a live sporting event.

3. The method of claim 1, wherein the common parameter within the historic data is situational data in a real time sporting event.

4. The method of claim 1, further comprising selecting a plurality of common parameters within the historic database and adjusting wagers for one or more of the common parameters.

5. The method of claim 1, further comprising displaying the updated odds on a mobile device.

6. The method of claim 1, further comprising initiating a wager adjustment following the completion of a play in a live sporting event.

7. The method of claim 1, wherein the correlations are based on situational data in a live sporting event, situational data in one or more previous sporting events, a number of wagers placed with respect to the situational data in the one or more previous sporting events, and amounts of wagers placed with respect to the situational data in the one or more previous sporting events.

8. A computer implemented method for providing odds in a game program using game information, comprising executing on a processor the steps of:
   displaying data related to a live sporting event in real time on a gaming device;
   displaying one or more wagers related to real time wagering in the live sporting event on the gaming device;
   displaying at least one or more factors related to odds adjustment for the one or more wagers on the gaming device; and
   displaying one or more adjusted odds for the one or more wagers based on the one or more factors on the gaming device.

9. The computer implemented method for providing odds in a game program using game information of claim 8, further comprising displaying the data related to the live sporting event in real time on a mobile device.

10. The computer implemented method for providing odds in a game program using game information of claim 8, further comprising displaying results of any wager placed from the one or more wagers.

11. The computer implemented method for providing odds in a game program using game information of claim 8, further comprising displaying situational data related to the live sporting event in real time.

12. The computer implemented method for providing odds in a game program using game information of claim 8, further comprising displaying statistical data related to the live sporting event in real time.

13. The computer implemented method for providing odds in a game program using game information of claim 8, further comprising displaying at least one of funds and points that are available to wager.

14. A method of adjusting wager odds, comprising filtering, with a server, a historic database to match a current wager available on a gaming device,
   selecting, with a server, a common parameter within historic data in the historic database,
   performing correlations, with a server, for the selected parameter against other parameters within the historic database,
   determining, with a server, if there is correlated data and the correlated data exceeds a first threshold,
   extracting, with a server, data points from the correlated data that exceeds the first threshold,
   comparing, with a server, the extracted data points to one or more second thresholds, and
   adjusting, with a server, a current wager on the gaming device if the extracted data exceeds at least one of the one or more second thresholds.

* * * * *